(12) United States Patent
Barraza Enciso et al.

(10) Patent No.: US 11,569,989 B2
(45) Date of Patent: Jan. 31, 2023

(54) BLOCKCHAIN SYSTEM FOR HARDENING QUANTUM COMPUTING SECURITY

(71) Applicant: Bank of America Corporation, Charlotte, NC (US)

(72) Inventors: Maria Carolina Barraza Enciso, New York, NY (US); Elena Kvochko, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 350 days.

(21) Appl. No.: 16/661,142

(22) Filed: Oct. 23, 2019

(65) Prior Publication Data

US 2021/0126779 A1    Apr. 29, 2021

(51) Int. Cl.
*H04L 9/08* (2006.01)
*G06N 10/00* (2022.01)

(52) U.S. Cl.
CPC .......... *H04L 9/0852* (2013.01); *G06N 10/00* (2019.01); *H04L 9/0869* (2013.01)

(58) Field of Classification Search
CPC ... H04L 67/10; H04L 67/104; H04L 67/1097; H04L 9/0869; H04L 9/0861; H04L 9/0819; H04L 9/0838; H04L 9/12; H04L 9/006; H04L 9/3236; H04L 9/3239; H04L 9/3242; H04L 9/3247; H04L 9/0637; H04L 9/0643; H04L 9/0852; H04L 9/0855; H04L 9/0858; H04L 63/061; H04L 63/06; H04L 63/0428; H04L 63/0435; H04L 2209/38; H04L 2209/56; G06Q 40/04; G06Q 2220/00;

(Continued)

(56) References Cited

U.S. PATENT DOCUMENTS 7,178,277 B2    2/2007    Takeuchi
7,519,641 B2    4/2009    Ribordy et al.
(Continued)

OTHER PUBLICATIONS

Chaoxuan Ma, Wesley D. Sacher, Zhiyuan Tang, Jared C. Mikkelsen, Yisu Yang, Feihu Xu, Torrey Thiessen, Hoi-Kwong Lo, and Joyce K. S. Poon, "Silicon photonic transmitter for polarization-encoded quantum key distribution," 2016, Optica 3, 1274-1278 (Year :2016).*

(Continued)

*Primary Examiner* — Jeremy S Duffield
(74) *Attorney, Agent, or Firm* — Weiss & Arons LLP

(57) ABSTRACT

A blockchain-based message transmission is provided. The system may include a plurality of silicon-based devices encapsulated in quantum cases. Each quantum case may include a quantum random number generator and a public key. The quantum random number generator may generate quantum-resilient random numbers to be used as private keys. The system may include a private network. The private network may include a subset of system's devices. A first device, included in the private network, may transmit a message to a second device included in the private network. A first quantum case that encapsulates the first device may intercept the message, generate a private key, encrypt the message using the private key, generate a data transaction block that includes message metadata, upload the data transaction block to a system blockchain and transmit the message to the recipient upon receipt of an approval from a majority of devices.

20 Claims, 2 Drawing Sheets

(58) Field of Classification Search
CPC ............. G06Q 20/3829; G06Q 20/389; G06Q 20/401; G06F 16/27; G06F 3/067; G06N 10/00

See application file for complete search history.

(56) References Cited

U.S. PATENT DOCUMENTS

| | | | |
|---|---|---|---|
| 7,577,257 | B2 | 8/2009 | Xia et al. |
| 7,590,868 | B2 | 9/2009 | Musa et al. |
| 7,697,693 | B1* | 4/2010 | Elliott ............... H04B 10/70 380/278 |
| 7,706,535 | B1 | 4/2010 | Pearson et al. |
| 7,929,700 | B2 | 4/2011 | Lodewyck et al. |
| 8,170,211 | B2 | 5/2012 | Langer |
| 8,340,298 | B2 | 12/2012 | Gelfond et al. |
| 8,483,394 | B2 | 7/2013 | Nordholt et al. |
| 8,582,769 | B2 | 11/2013 | Zhao et al. |
| 8,639,932 | B2 | 1/2014 | Wiseman et al. |
| 8,650,401 | B2 | 2/2014 | Wiseman et al. |
| 8,693,691 | B2 | 4/2014 | Jacobs |
| 8,744,075 | B2 | 6/2014 | Tanaka |
| 8,897,449 | B1 | 11/2014 | Broadbent |
| 8,903,094 | B2 | 12/2014 | Bovino |
| 9,663,358 | B1 | 5/2017 | Cory et al. |
| 9,698,979 | B2 | 7/2017 | Armstrong et al. |
| 10,127,499 | B1 | 11/2018 | Rigetti et al. |
| 10,296,047 | B2 | 5/2019 | Kailman et al. |
| 10,348,493 | B2 | 7/2019 | Fu et al. |
| 10,644,882 | B2 | 5/2020 | Kurian |
| 10,708,046 | B1* | 7/2020 | Ashrafi ............ H04L 9/0841 |
| 10,802,800 | B1 | 10/2020 | Vakili |
| 11,120,357 | B2 | 9/2021 | Zeng et al. |
| 2004/0025061 | A1* | 2/2004 | Lawrence ............ G06F 1/3296 713/300 |
| 2010/0223385 | A1 | 9/2010 | Gulley et al. |
| 2011/0182428 | A1 | 7/2011 | Zhao et al. |
| 2011/0317836 | A1 | 12/2011 | Yeh et al. |
| 2013/0315395 | A1* | 11/2013 | Jacobs ............... H04L 9/0852 380/278 |
| 2014/0068765 | A1 | 3/2014 | Choi et al. |
| 2014/0355998 | A1 | 12/2014 | Tanzilli et al. |
| 2015/0199178 | A1 | 7/2015 | Shi et al. |
| 2016/0226840 | A1* | 8/2016 | Buccella ............ H04L 63/067 |
| 2017/0038793 | A1 | 2/2017 | Kailman et al. |
| 2017/0063827 | A1 | 3/2017 | Ricardo |
| 2018/0089733 | A1 | 3/2018 | Huang et al. |
| 2018/0190589 | A1* | 7/2018 | Waidhas ............ H01L 23/5387 |
| 2018/0240032 | A1 | 8/2018 | Van Rooyen |
| 2018/0309785 | A1 | 10/2018 | Kurian |
| 2018/0365585 | A1 | 12/2018 | Smith et al. |
| 2018/0375650 | A1 | 12/2018 | Legre |
| 2019/0026234 | A1 | 1/2019 | Harnik et al. |
| 2019/0097792 | A1 | 3/2019 | Howe et al. |
| 2019/0097935 | A1* | 3/2019 | Flajslik ............ H04L 43/0888 |
| 2019/0322298 | A1 | 10/2019 | Mong et al. |
| 2020/0043007 | A1 | 2/2020 | Simons |
| 2020/0274697 | A1* | 8/2020 | Ragan ............ H04L 63/0435 |
| 2020/0304292 | A1 | 9/2020 | Mochalov |
| 2020/0351089 | A1* | 11/2020 | Wentz ............ G06Q 20/3827 |
| 2020/0387395 | A1* | 12/2020 | Viale ............ G06F 9/466 |
| 2021/0044433 | A1 | 2/2021 | Hay et al. |
| 2021/0081935 | A1* | 3/2021 | Faulkner ............ G06Q 20/3674 |
| 2021/0083863 | A1 | 3/2021 | Bush |
| 2021/0314143 | A1* | 10/2021 | Conner ............ H04L 9/3239 |

OTHER PUBLICATIONS

Crosby et al., "BlockChain Technology-Beyond Bitcoin," Sutarjda Center for Entrepreneurship and Technology Technical Report, Oct. 16, 2015.

Quintessence et al.; Quantum Tunneling Away From Cyber Criminals; Feb. 2018; Quintessence Labs. (Year: 2018).

Jason M. Rubin, "Can a Computer Generate a Truly Random Number?" https://engineering.mit.edu/engage/ask-an-engineer/can-a-computer-generate-a-truly-random-number/, Nov. 1, 2011.

John Kelsey et al., "Cryptanalytic Attacks on Pseudorandom Number Generators," https://www.schneier.com/academic/paperfiles/paper-prngs.pdf. University of California Berkeley, 1998.

Tom Foremski, IBM Warns of Instant Breaking of Encryption by Quantum Computers: 'Move Your Data Today', https://www.zdnet.com/article/ibm-warns-of-instant-breaking-of-encryption-by-quantum-computers-move-your-data-today/, CBS Interactive, May 18, 2018.

John Cox, "New iOS App Secures IM Traffic with 'Post Quantum' Encryption Scheme PQChat Intended as Secure Alternative to WhatsApp," https://www.networkworld.com/article/2177124/new-ios-app-secures-im-traffic-with--post-quantum--encryption-scheme.html, Network World, May 23, 2014.

Jack Purcher, "Apple Patent Reveals Breakthrough Quantum Tunneling Touch-Sensitive Materials for iPhone, Smart Cases & More," https://www.patentlyapple.com/patently-apple/2017/02/apple-patent-reveals-breakthrough-quantam-tunneling-touch-sensitive-materials-for-iphone-smart-cases-more.html, Feb. 9, 2017.

Robert Samuel Hanson, "Quantum Computers will Break the Encryption that Protects the Internet," https://www.economist.com/science-and-technology/2018/10/20/quantum-computers-will-break-the-encryption-that-protects-the-internet, The Economist, Oct. 20, 2018

Cathal O'Connell, "Quantum Computing for the Qubit Curious," https://cosmosmagazine.com/physics/quantum-computing-for-the-qubit-curious, Cosmos, Aug. 8, 2016.

"Quantum Computing," https://en.wikipedia.org/wiki/Quantam_computing, Wikimedia Foundation, Inc., Jul. 14, 2019.

Lily Chen et al., "Report on Post-Quantum Cryptography," 9 https://nvlpubs.nist.gov/nistpubs/ir/2016/NIST.IR.8105.pdf, National Institute of Standards and Technology, Apr. 2016.

"Security Token," https://en.wikipedia.org/wiki/Security_token, Wikimedia Foundation, Inc., Jun. 21, 2019.

Gorjan Alagic et al., "Status Report on the First Round of the NIST Post-Quantum Cryptography Standardization Process," https://www.nist.gov/publications/status-report-first-round-nist-post-quantum-cryptography-standardization-process, National Institute of Standards and Technology, Jan. 2019.

Christian S. Calude and Elena Calude, "The Road to Computational Supremacy," https://arxiv.org/pdf/1712.01356.pdf, Jan. 10, 2019.

Patrick Nohe, "What is an Air Gapped Computer?" https://www.thesslstore.com/blog/air-gapped-computer/, HashedOut, Mar. 13, 2018.

Emily Grumbling and Mark Horowitz, "Quantum Computing: Progress and Prospects," https://www.nap.edu/read/25196/chapter/1, National Academy of Sciences, 2018.

"An Introduction to High Availability Architecture," https://www.getfiledcloud.com/blog/an-introduction-to-high-availability-architecture/, CodeLathe Technologies Inc., Retrieved on Sep. 26, 2019.

Ren et al., "Clock Synchronization Using Maximal Multipartite Entanglement," Jul. 2, 2012.

Lohe, "Quantum Synchronization Over Quantum Networks," Journal of Physics A, 2010.

* cited by examiner

BLOCKCHAIN SYSTEM FOR HARDENING QUANTUM COMPUTING SECURITY

FIELD OF TECHNOLOGY

This disclosure relates to blockchain systems.

BACKGROUND

A blockchain is a distributed database of records or public ledger of all transactions or digital events that have been executed and shared among participants. Each transaction or digital event in the public ledger is verified by a majority of participants included in the system. Once a transaction or digital event is executed, it can never be erased. Therefore, the blockchain contains a certain and verifiable record of every single transaction.

Because of the unique characteristics specific to blockchain technology—i.e., no central database and the inability to erase a transaction—blockchain technology has the ability to revolutionize the digital world by enabling a distributed record of every online transaction that can be verified at any time in the future. Blockchain technology does not compromise the privacy of digital assets and the parties involved because the blocks, included on the chain, either do not include private data or include an encrypted version of private data. The distributed consensus and the anonymity are two important characteristics of blockchain technology.

One use of blockchain technology involves smart contracts. Smart contracts are computer programs that can automatically execute the terms of a contract. A smart contract may be made between two or more participating entities. When a preconfigured condition in a smart contract is met, payments between the parties involved in the contractual agreement can be executed, as per the contract, in a transparent manner.

Quantum computing is the use of quantum-mechanical phenomena such as superposition and entanglement to perform computations. The smallest bit in a quantum computer is called a qubit. Quantum computing differs from classical computing in such a way that each qubit can be in a zero state and a one state at the same time.

The amount of data that a quantum computer is able to hold and manipulate grows exponentially with the number of qubits included in the quantum computer. A quantum computer with n qubits is able to simultaneously represents $2^n$ states. Therefore, two qubits can hold four states, three qubits can hold eight states and fifty qubits can hold 1,125,899,906,842,624 states.

It would be desirable to utilize blockchain technology in a quantum computing system. Such a system would harness the indelible and distributed properties of blockchain technology to secure communications within a quantum computing system.

SUMMARY OF THE DISCLOSURE

Apparatus and methods for message transmission within a system is provided. The system may include a plurality of silicon-based devices. Each of the silicon-based devices may be encased in quantum cases. The system may include a first private network. The first private network may include a subset of the plurality of silicon-based devices included in the system.

The method may include transmitting a message from a first device to a second device. The first device may be encased in a first quantum case. The first device may be included in the first private network. The first private network may be a subset of the system. The second device may be encased in a second quantum case. The second device may be included in the first private network.

The method may include intercepting the message at the first quantum case. The method may include generating a private key at a quantum random number generator included in the first quantum case.

The method may include synchronizing the private key with the plurality of devices included in the first private network. The private key synchronization may be performed via a quantum entanglement module included in each quantum case included in the private network.

The method may include encrypting the message at the first quantum case. The message may be encrypted using a private key.

The method may include generating a data transaction block at the first quantum case using a first case public key. The data transaction block may include metadata relating to the message. The metadata may include a transmitting device identifier, a recipient device identifier and a cryptographic hash of the message.

The method may include broadcasting the data transaction block. The data transaction block may be broadcasted by the first quantum case to the plurality of devices included in the system.

The method may include broadcasting a data transaction block approval. The data transaction block approval may be broadcasted from a majority of devices included in the system to the plurality of devices included in the system.

The method may include adding the data transaction block (or block approval, or both transaction block and block approval) to a system blockchain. The system blockchain may be available for retrieval by the plurality of devices included in the system. In some embodiments, the adding the transaction block to the system blockchain may be prior to the first quantum case transmitting the message to the second quantum case. In other embodiments, the adding the transaction block to the system blockchain may occur after the first quantum case transmits the message to the second quantum case.

The method may include receiving the message by the second quantum case, from the first quantum case.

The method may include decrypting the message, at the second quantum case, using the private key.

The plurality of silicon-based devices included in the system may communicate via quantum tunneling with a plurality of silicon-based devices located outside of the system.

The system may be a smart contract system. The smart contract system may include a contract between the first device and the second device. The contract may include pre-set terms. The message may be transmitted automatically upon fulfillment of one or more of the pre-set terms.

In some embodiments, the data transaction block may include a transmitting device identifier, a recipient device identifier and the encrypted message. In these embodiments, the encrypted message may be added to the system blockchain as part of the data transaction block. The encrypted message may be available for retrieval by the plurality of devices included in the system. However, the message may only be decrypted using the private key. Therefore, although the message is available for retrieval it may only be read by devices that are able to decrypt the message.

It should also be appreciated that, in these embodiments, the data transaction block may not be specifically transmitted from the first device to the second device. Rather, the second device may receive the broadcast and determine, based on the recipient identifier, to download the data transaction block. In certain embodiments, the second device may view the system blockchain, and automatically download the data transaction block.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
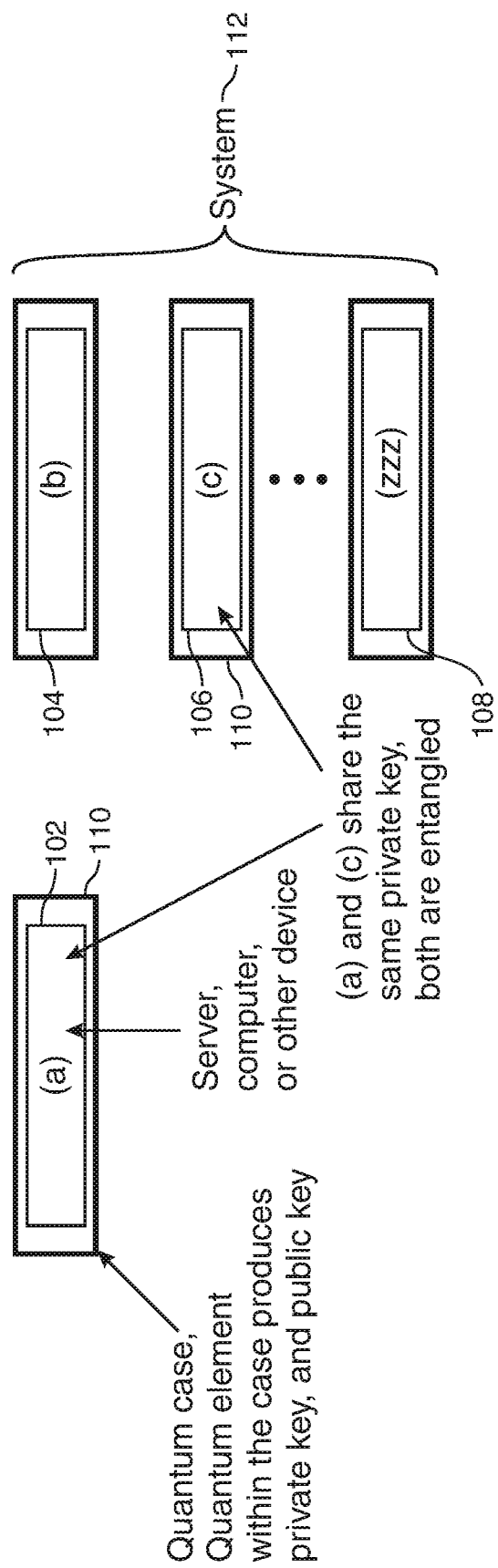
FIG. 1 shows an illustrative diagram in accordance with principles of the disclosure.

A blockchain-based message transmission system is provided. The system may include a plurality of devices. Each of the plurality of devices may be encapsulated in a quantum case. Each quantum case may include a quantum random number generator. The quantum random number generator may be operable to generate quantum-resilient random numbers. The quantum-resilient random numbers are used as private cryptographic keys. Each quantum case may also include a public cryptographic key.

The system may include at least one private network. The private network may include a subset of the plurality of devices encapsulated in quantum cases. A first device, included in the private network, may be operable to transmit a message to a second device within the private network. A first quantum case, that encapsulates the first quantum device, may be operable to intercept the message. The first quantum case, using the quantum random number generator, may be operable to generate a quantum random number. The quantum random number may be used as a private key. The first quantum case may be operable to encrypt the message using the private key. The first quantum case may be operable to utilize a public cryptographic key to generate a data transaction block. The data transaction block may include a transmitting device identifier and a recipient device identifier. The data transaction block may also include the message or a cryptographic hash of the message.

In some embodiments, the system may also include a public network. In other embodiments, the system may involve a public network, such as the internet. In embodiments that include or involve a public network, a data transaction block including data transaction details may be published to a publicly available distributed ledger. In such embodiments, because the data transaction block is made public, confidential transaction details may be encrypted in order to preserve the confidentiality of the transaction details.

The first quantum case may be operable to broadcast the data transaction block to the plurality of devices. A majority of the plurality of devices may be operable to broadcast a data transaction block approval. The data transaction block may be added to a system blockchain. The system blockchain may be available for retrieval by each of the plurality of devices.

A second quantum case that encapsulates the second device may be operable to retrieve the data transaction block from the blockchain. The second quantum case may be operable to decrypt the message, included in the data transaction block, using the private key.

The second quantum case may retrieve the data transaction block from the blockchain using the public cryptographic key. The private key, included in the first quantum case, and the private key included in the second quantum case, may be synchronized within the private network.

Each case included in the private network may include a quantum computing element. The quantum computing element may be configured to synchronize with other quantum computing elements included in other cases included in the private network. The quantum computing element may leverage quantum entanglement properties.

The private network may be a smart contract system. The smart contract system may include a predetermined contract between the first device and the second device. The contract may include pre-set terms. The message may be transmitted automatically upon fulfillment of one or more of the pre-set terms.

The quantum cases may communicate with devices external to the system using quantum tunneling.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

FIG. 1 shows an illustrative diagram. The diagram may demonstrate an illustrative system, shown at 112. System 112 may include device a, shown at 102, device b, shown at 104, device c, shown at 106, and device zzz, shown at 108. There may be multiple, additional devices included in the system and not shown on the diagram, as indicated by the dots between device c and device zzz.

Each of devices a, b, c and zzz may be a server, computer or other device. Each of devices a, b, c and zzz may be a silicon-based device. Each of the silicon-based devices may be encased in a quantum case. The quantum case that encapsulates device a may be shown at 110. The quantum cases that encapsulate devices b, c and zzz may be similar to quantum case 110.

Quantum case 110 may include a quantum element. The quantum element may produce or generate a private key and/or a public key.

Quantum case 110, that encapsulates device a, and quantum case 114, that encapsulates device c, may share the same private key. The quantum elements included in quantum cases 110 and 114 may be entangled using quantum entanglement properties. The quantum entanglement properties may enable the synchronization of the private keys.

In some embodiments, quantum cases that share a private key may be considered to be part of a private network.

Figure 2:
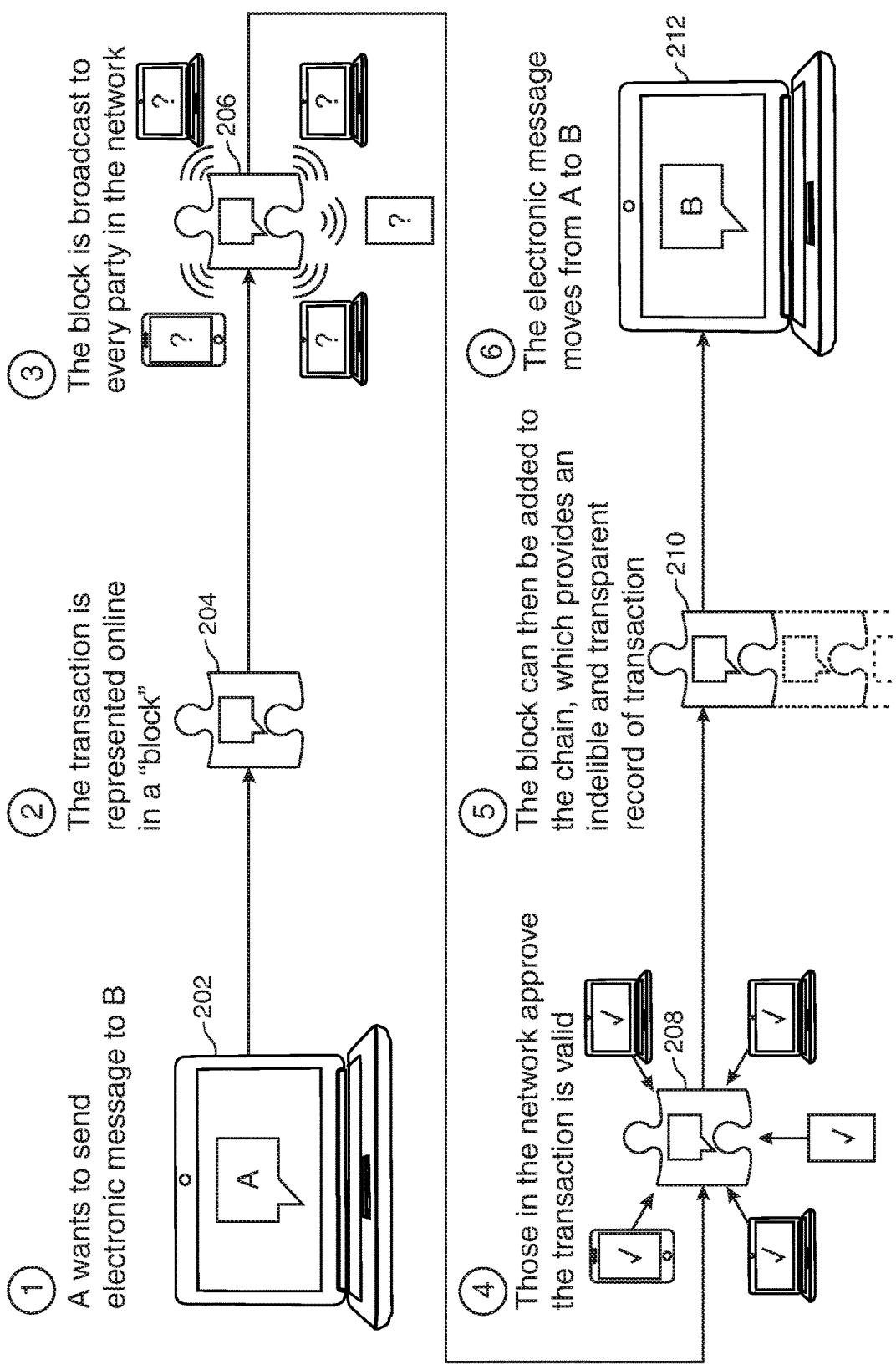
FIG. 2 shows another illustrative diagram in accordance with principles of the disclosure.

FIG. 2 shows an illustrative diagram. The illustrative diagram may show how a blockchain works. The blockchain may be used to provide an indelible and transparent record of messages that have been transferred between cases included in the network. The blockchain may include encrypted messages and, therefore, only enable the appropriate recipient to view the encrypted message. The private key, used to decrypt the message, may be shared between participants of the private network. In some embodiments, the private key may be a dynamic key.

Step 1, shown at 202, shows device A expresses an intention ("wants") to send an electronic message to device B. The electronic message between device A and device B may be termed a transaction.

The transaction may be represented on a network as a block, as shown at 204. The block may include transmitter data, recipient data, message data and any other suitable data.

The block may be broadcast to every party or device on the network, as shown at 206. The parties, or devices, included in the network may approve the transaction and, thereafter, characterize the transaction as valid, as shown at 208. The parties and/or devices may broadcast their approval and/or transmit their approval to the transmitting party or device.

Upon receipt of a predetermined amount of approvals from the parties and/or devices included in the network, the transaction may be determined to be valid. The predetermined amount of approvals may include a percentage of the parties or devices, such as a majority of the parties or devices. The predetermined amount of approvals may include approvals from a predetermined amount of a specific type of device, such as a non-IoT device. The predetermined amount of approvals may include substantially all of the devices in the network.

Upon receipt of the predetermined amount of approvals from the parties and/or devices included in the network, the block can be added to the chain, as shown at 210. The chain provides an indelible and transparent record of the transaction.

In embodiments where the electronic message is separate from the blockchain, upon placement of the block on the chain, the electronic message moves from A to B, as shown at 212.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for a blockchain system for hardening quantum computing security have been provided. Persons skilled in the art will appreciate that the present invention can be practiced by other than the described embodiments, which are presented for purposes of illustration rather than of limitation.

What is claimed is:

1. A method for message transmission within a system, the system comprising a plurality of silicon-based devices encased in quantum cases, the system comprising a first private network, the first private network comprising a subset of the plurality of silicon-based devices included in the system, the method comprising:
   transmitting a message from a first silicon-based device to a second silicon-based device, wherein:
      the first silicon-based device is encased in a first quantum case, the first silicon-based device is a first entity, and the first quantum case is a second entity, and the first entity and the second entity are independent from each other;
      the first silicon-based device is included in the first private network;
      the first private network is a subset of the system;
      the second silicon-based device is encased in a second quantum case, the second silicon-based device is a third entity, and the second quantum case is a fourth entity, and the third entity and the fourth entity are independent from each other;
      the second silicon-based device is included in the first private network; and
      each case of each device included in the first private network includes a quantum computing element;
   intercepting the message at the first quantum case;
   generating a private key at a quantum random number generator included in the first quantum case;
   synchronizing the private key with the plurality of devices included in the first private network;
   encrypting the message, using the private key, at the first quantum case;
   generating a data transaction block at the first quantum case using a first case public key, the data transaction block comprising metadata relating to the message, said metadata comprising:
      a transmitting device identifier;
      a recipient device identifier; and
      a cryptographic hash of the message;
   broadcasting, by the first quantum case, the data transaction block, to the plurality of devices included in the system;
   broadcasting, from a majority of the devices included in the system, a data transaction block approval, to the plurality of devices included in the system;
   adding the data transaction block to a system blockchain, said system blockchain being available for retrieval by the plurality of devices included in the system;
   receiving the message, by the second quantum case, from the first quantum case; and
   decrypting the message, at the second quantum case, using the private key.

2. The method of claim 1, wherein the private key synchronization is performed via a quantum entanglement module included in each quantum case included in the private network.

3. The method of claim 1, wherein the plurality of silicon-based devices included in the system communicates via quantum tunneling with a plurality of silicon-based devices located outside of the system.

4. The method of claim 1, wherein:
   the system is a smart contract system, the smart contract system that includes a contract between the first device and the second device, said contract comprising pre-set terms; and
   the message is transmitted automatically upon fulfillment of one or more of the pre-set terms.

5. The method of claim 1, wherein the adding the transaction block to the system blockchain is prior to the first quantum case transmitting the message to the second quantum case.

6. The method of claim 1, wherein the adding the transaction block to the system blockchain is after the first quantum case transmits the message to the second quantum case.

7. A method for message transmission within a system comprising a plurality of silicon-based devices, the method comprising:
   transmitting a message from a first silicon-based device in the system, encased in a first quantum case, to a second silicon-based device in the system, encased in a second quantum case, the first silicon-based device is a first entity and the first quantum case is a second entity and the first entity and the second entity are independent from each other, the second silicon-based device is a third entity and the second quantum case is a fourth entity and the third entity and the fourth entity are independent from each other;
   intercepting the message at the first quantum case;
   encrypting the message, using a private key, at the first quantum case;
   generating a data transaction block, using a first case public key, at the first quantum case, the data transaction block comprising:
      a transmitting silicon-based device identifier;
      a recipient silicon-based device identifier; and
      the encrypted message;
   broadcasting, by the first quantum case, the data transaction block to the plurality of silicon-based devices included in the system;
   broadcasting, from a majority of the silicon-based devices included in the system, a data transaction block approval, to the plurality of silicon-based devices included in the system;
   adding the data transaction block to a system blockchain, said system blockchain being available for retrieval by the plurality of silicon-based devices included in the system;
   retrieving the message, by the second quantum case, from the system blockchain;
   decrypting the message, at the second quantum case, using the private key; and
   wherein each case of each device included in the system includes a quantum computing element.

8. The method of claim 7, wherein the private key is synchronized between the first quantum case and the second quantum case.

9. The method of claim 7, wherein the first silicon-based device and the second silicon-based device are included in a second plurality of silicon-based devices that are identified as being members of a private network of the system.

10. The method of claim 9, wherein, each of the plurality of silicon-based devices identified as being members of the private network include the private key that is synchronized between the plurality of devices identified as the private network.

11. The method of claim 10, wherein the quantum computing element, included in each case of each device, is configured to synchronize with other quantum computing elements included in other cases included in the private network.

12. The system of claim 11, wherein the quantum computing element leverages quantum entanglement properties.

13. A blockchain-based message transmission system, the system comprising:
   a plurality of silicon-based devices, each of the plurality of devices encapsulated in a quantum case, each of the plurality of devices being a first entity and each quantum case being a second entity, respectively, and the first entity and the second entity are independent from each other, respectively, each quantum case comprising:
      a quantum random number generator operable to generate quantum-resilient random numbers, the quantum-resilient random numbers are used as private cryptographic keys; and
      a public cryptographic key;
   at least one private network, the private network comprising a subset of the plurality of devices encapsulated in quantum cases;
   wherein:
      a first silicon-based device, included in the private network, is operable to transmit a message to a second silicon-based device within the private network;
      a first quantum case, that encapsulates the first silicon-based device, is operable to intercept the message, the first quantum case comprises a first quantum random number generator;
      the first quantum case, using the first quantum random number generator, is operable to generate a quantum random number to be used as a private key;
      the first quantum case is operable to encrypt the message using the private key;
      the first quantum case is operable to utilize the public cryptographic key to generate a data transaction block, the data transaction block comprising:
         a transmitting device identifier;
         a recipient device identifier; and
         the message;
      the first quantum case is operable to broadcast the data transaction block to the plurality of devices;
      a majority of the plurality of devices are operable to broadcast a data transaction block approval;
      the data transaction block is added to a system blockchain, wherein the system blockchain is available for retrieval by each of the plurality of devices;
      a second quantum case that encapsulates the second device is operable to retrieve the data transaction block from the blockchain, the second quantum case comprises a second quantum random number generator; and
      the second quantum case is operable to decrypt the message, included in the data transaction block, using the private key.

14. The system of claim 13, wherein the second quantum case retrieves the data transaction block from the blockchain using the public cryptographic key.

15. The system of claim 13, wherein the private key, included in the first quantum case, and the private key, included in the second quantum case, are synchronized within the private network.

16. The system of claim 13, wherein each case included in the private network includes a quantum computing element, the quantum computing element is configured to synchronize with other quantum computing elements included in other cases included in the private network.

17. The system of claim 16, wherein the quantum computing element leverages quantum entanglement properties.

18. The system of claim 13, wherein the quantum cases communicate with silicon-based devices external to the system using quantum tunneling.

19. The system of claim 13, wherein the private network is a smart contract subsystem.

20. The system of claim 19, wherein:
the system is a smart contract system, the smart contract system that includes a contract between the first silicon-based device and the second silicon-based device, said contract comprising pre-set terms; and
the message is transmitted automatically upon fulfillment of one or more of the pre-set terms.

* * * * *